United States Patent [19]
Brown

[11] Patent Number: 5,195,813
[45] Date of Patent: Mar. 23, 1993

[54] WIRELESS CONTROL FOR AUXILIARY LIGHTING

[75] Inventor: Peter K. Brown, Flagstaff, Ariz.

[73] Assignee: KC Hilites, Inc., Williams, Ariz.

[21] Appl. No.: 754,405

[22] Filed: Sep. 3, 1991

[51] Int. Cl.$^5$ .............................................. F21M 3/02
[52] U.S. Cl. ....................................... 362/61; 362/80; 362/233; 315/77
[58] Field of Search ............... 362/61, 66, 80, 418, 362/419, 421, 427, 428, 833, 74, 233; 315/77

[56] References Cited

U.S. PATENT DOCUMENTS

| | | | |
|---|---|---|---|
| 4,037,134 | 7/1977 | Löper | 362/61 |
| 4,768,139 | 8/1988 | Kretschmer et al. | 362/61 |
| 4,779,168 | 10/1988 | Montgomery | 362/66 |
| 4,859,982 | 8/1989 | Seaburg | 362/61 |

Primary Examiner—Richard R. Cole
Attorney, Agent, or Firm—Cahill, Sutton & Thomas

[57] ABSTRACT

One or more auxiliary lighting systems are attached to the exterior of a motor vehicle. A control module is located in the engine compartment and connected to the auxiliary lighting system(s) and the battery. A very low power transmitter, located in the cabin of the vehicle, transmits a simple pulse or an encoded signal, depending upon the number of auxiliary lighting systems used. The module includes a receiver and a sensor for detecting the operation of the vehicle's original equipment lighting. Logic within the module turns on the auxiliary lighting upon request in accordance with predetermined conditions, such as low beams but not high beams being turned on.

6 Claims, 2 Drawing Sheets

WIRELESS CONTROL FOR AUXILIARY LIGHTING

FIELD OF THE INVENTION

This invention relates to auxiliary lighting systems in a motor vehicle and, in particular, to apparatus for controlling auxiliary lamps.

BACKGROUND OF THE INVENTION

The use of additional or auxiliary lighting systems in motor vehicles is well known. Such auxiliary lighting includes what are known as fog lamps, utility lamps, emergency lamps, driving lamps, and off-road lamps. These lamps differ in the intensity and pattern of the light beam produced and are especially tailored to the respective applications. As used herein, an "auxiliary lighting system" refers to one or more (usually two or more) lamps of a given type, e.g. driving lamps, operated simultaneously. These lamps are usually "aftermarket" items, i.e. they are added by the owner of the vehicle rather than by the manufacturer. The lamps of such auxiliary lighting systems are usually mounted on the exterior of the vehicle; however, under certain circumstances, the lamps may be mounted within the vehicle. For example, police or other emergency vehicles sometimes have red and blue lamps mounted adjacent the rear window on the platform between the rear seat and the rear window. These emergency lights are intended solely to direct light outwardly and away from the vehicle rather than internally of the cabin of the vehicle. Therefore, as used herein, the term "exterior" refers to usual auxiliary lighting positions such as bumpers, rollbars, etc., and also includes those lights which although mounted within the vehicle are primarily for directing light outside of the vehicle such as the above described emergency lights.

In a typical application, fog lamps for example, are added to a vehicle by mounting the lamps in a suitable location, typically on the front bumper. Power for the lamps is supplied from the battery through a control switch mounted within convenient reach of the driver in the cab or cabin of the vehicle. For modern vehicles, particularly automobiles and light trucks, adding wiring through the firewall is becoming increasingly difficult due to the compact arrangement of the engine compartment, the considerable number of existing wires, and the limited space available in the firewall through which the wires can pass. Such modification also requires a moderate amount of skill on the part of the owner in order to make the modifications.

Even with access through the firewall, locating the control switch on the dashboard can present a considerable problem due to the layout of the dashboard. Further, once the switch is located, it is relatively permanent since the owner does not want extra holes in the dashboard. Thus, the owner has to pick a spot for the control switch and live with the choice even if subsequent use indicates another location would have been preferable.

Most vehicles limit the use of auxiliary lighting by requiring that auxiliary lighting be used only in conjunction with the vehicle's headlight system. All states also require that auxiliary lighting not replace existing lighting, i.e. the auxiliary lighting must be used in conjunction with low beam lamps. The driver may not always be aware of whether or not his high beam lamps are in use or if he is only using parking lamps, e.g. at twilight. Prior art controls for auxiliary lighting rely on the driver to determine proper operation of the auxiliary lighting system.

It is known in the art to remotely control garage door openers by way of a very low power radio transmitter within the cabin of a vehicle. It is also known to operate security devices and remote starters by means of a very low power radio transmitter located on the person of the owner or driver.

In view of the foregoing, it is therefore an object of the present invention to eliminate control wiring for auxiliary lighting by remotely controlling same from within the cab or cabin of the vehicle.

Another object of the present invention is to provide means for remotely controlling auxiliary lighting which can be relocated within the cab or cabin of the vehicle.

A further object of the present invention is to provide means for automatically controlling auxiliary lighting in conformity with the vehicle manufacturer's recommendations and local traffic laws.

Another object of the present invention is to provide an auxiliary lighting system which is easily installed by the owner of the vehicle.

A further object of the present invention is to provide an auxiliary lighting system which is less expensive and/or simpler to install for the manufacturer of the vehicle.

SUMMARY OF THE INVENTION

The foregoing objects are achieved in the present invention by means of a module located in the engine compartment and connected to the auxiliary lighting system(s) and the battery. A very low power transmitter, located in the cabin of the vehicle, transmits a simple pulse or an encoded signal, depending upon the number of auxiliary lighting systems used. The module includes a receiver and a sensor for detecting the operation of the vehicle's original equipment lighting. The module turns on the auxiliary lighting upon request in accordance with predetermined conditions, such as low beams but not high beams being turned on.

BRIEF DESCRIPTION OF THE DRAWINGS

A more complete understanding of the present invention can be obtained by considering the following detailed description in conjunction with the accompanying drawings in which.

DETAILED DESCRIPTION OF THE PREFERRED EMBODIMENT

Figure 1:
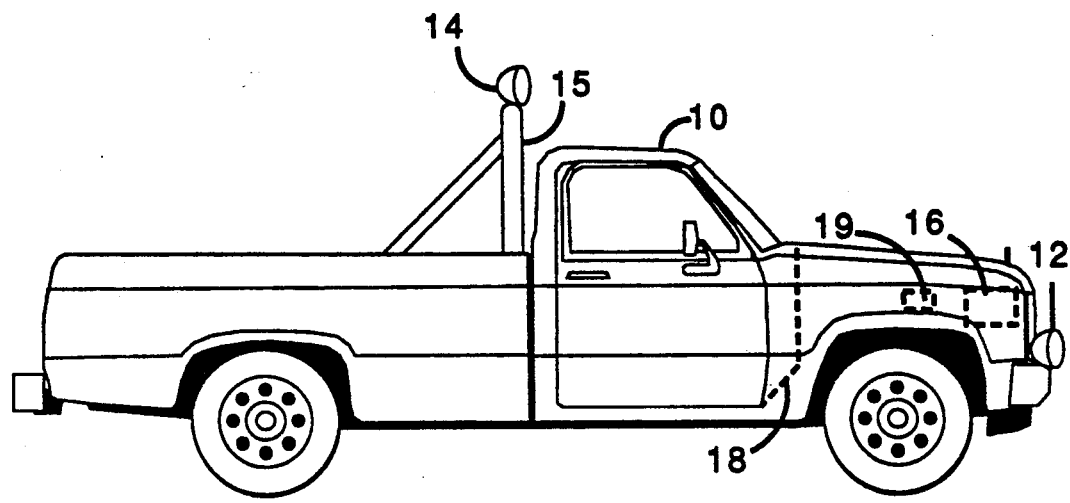
FIG. 1 illustrates a vehicle having fog lamps and off-road lamps.

In FIG. 1, pick-up truck 10 has two auxiliary lighting systems, each comprising a pair of lamps, although only one lamp from each pair is shown in the side view of FIG.1. The first auxiliary lighting system contains fog lamps such as lamp 12 mounted on the front bumper of truck 10. The second auxiliary lighting system comprises off-road lamps such as lamp 14, mounted on rollbar or lightbar 15.

Power for both of the auxiliary lighting systems is readily obtained by wiring the lamps to battery 16. A problem arises in selectively controlling the lamps because the wiring to the switches used in the prior art must pass through firewall 18.

In accordance with the present invention, control module 19 is mounted within the engine compartment at a convenient location and connected to battery 16 and lamps 12 and 14. Control is provided by a small, low power transmitter (not shown) kept in the cab of pickup 10 at any desired location, e.g. adhesively mounted to the dashboard or door or clipped to a visor. By pushing a button on the transmitter, the driver can turn on or turn off the systems independently of each other.

Figure 2:
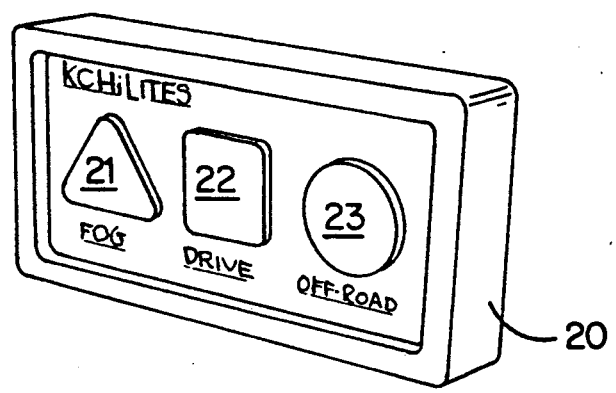
FIG. 2 illustrates a preferred embodiment of a transmitter in accordance with the present invention.

FIG. 2 illustrates transmitter 20 in more detail. Transmitter 20 preferably comprises distinctively shaped buttons, one for each auxiliary lighting system. For example, button 21 is triangular in shape and controls the fog lamps. Button 22 is square and controls the off-driving lamps. Button 23 is round and controls the off-road lamps. The association of a particular shape with a particular is arbitrary. The buttons can be distinctively textured instead of or in addition to a particular shape in order to further assure that the driver can easily select the desired lighting system without necessarily taking his eyes off the road. The buttons can also be distinctively colored to enhance visual selection.

The back side of transmitter 20, opposite the buttons, preferably is covered with a mild adhesive, i.e. so that transmitter 20 can be removed without damage to the surface to which it is attached, but strong enough to retain transmitter 20 in normal use. The transmitter can be mounted, for example, on the steering column or the dashboard. Alternatively, the back side of transmitter 20 contains a clip for mounting the transmitter on the visor, or other portion, of the vehicle. In either event, transmitter 20 can be mounted anywhere within the cabin of vehicle 10 and moved if the originally chosen location proves unsuitable or undesirable.

The internal construction of transmitter 20 is well known per se in the art. Pressing a button causes transmitter 20 to emit a distinctive signal for each auxiliary lighting system, e.g. by tone code modulation.

Figure 3:
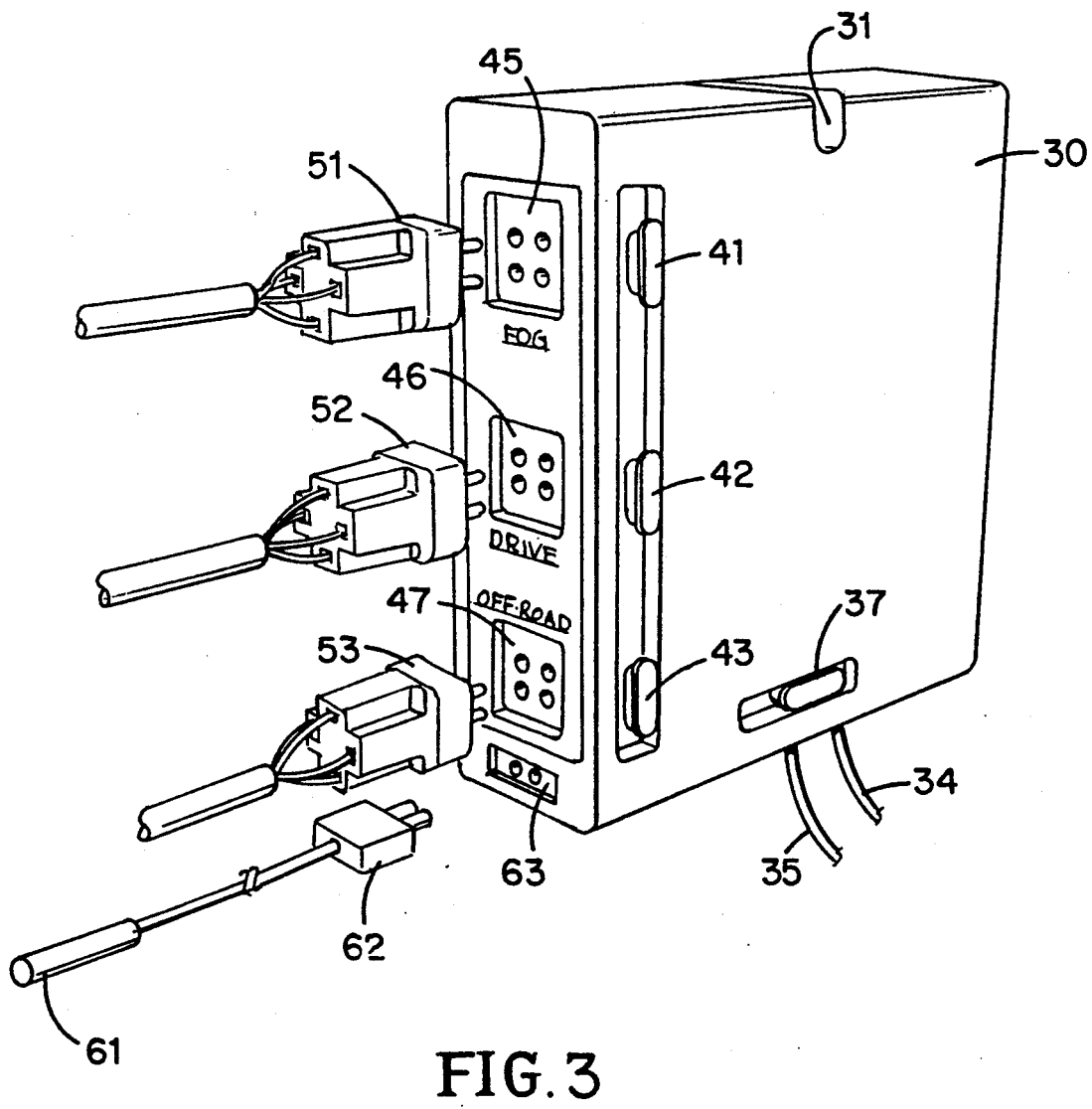
FIG. 3 illustrates a preferred embodiment of a control module in accordance with the present invention.

FIG. 3 illustrates in greater detail the control module mounted inside the engine compartment. Specifically, module 30 comprises one or more molded-in recesses, such as recess 31, for receiving a screw or bolt for attaching the module to the interior of the engine compartment.

Leads 34 and 35 are connected to the battery of the vehicle and supply the power controlled by module 30. Series connected with the positive lead (in a negative ground system) is fuse 37, which acts as the main fuse for the system and has a rating exceeding the sum of the loads imposed by the controlled lighting systems. Each lighting system is also protected by its own fuse, indicated as fuses 41, 42, and 43. Sockets 45, 46, and 47 receive plugs 51, 52, 53, respectively. One plug and socket combination serves each lighting system.

Assuming that each lighting system uses two lamps, it is preferred that four wires be used for each circuit: left and right supply wires and left and right ground wires. This assures adequate wiring for each lamp. It also enables the lamps to be mounted on insulating surfaces, fiberglass roofs, for example.

By virtue of the orientation of recess 31, module 30 is mounted correct-side out so that the fuses are readily visible to the operator of the vehicle. Proper orientation can be further indicated to the person installing module 30 by supplying mounting screws which are shorter than the thickness of module 30.

Sockets 45–47 are preferable recessed and shaped to prevent rotation of the plugs. Square or rectangular recesses are preferred. This assures a reliable connection which is physically strong and resists dirt entering the contact area. The corners of the recesses are rounded both for the sake of appearance and to reduce stress in the plastic housing of module 30 in the event the plug is subjected to twisting or sideward forces. The sockets and plugs can be color coded to match the buttons on transmitter 20.

Operation of the high beam circuit is detected by means of a suitable sensor 61, such as a Hall-effect probe, magnetic reed switch, electric field sensor, or direct contact to the supply side of the high beam filament. Sensor 61 is connected to module 30 by way of plug 62 and recessed socket 63. Depending upon application, additional sensors can be provided for other functions, e.g. detecting whether or not the low beam filaments are energized or other similar sensing functions.

Figure 4:
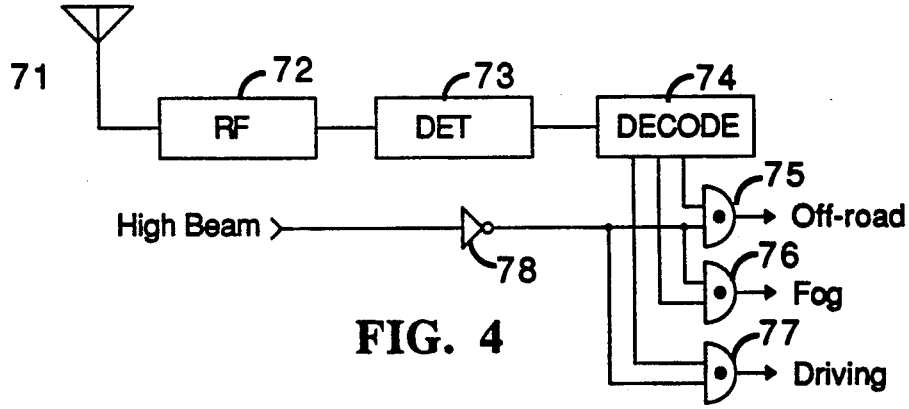
FIG. 4 illustrates the internal logic of the control module.

Logic within module 30 controls the operation of the auxiliary lighting systems in accordance with the sensor inputs. This is illustrated in FIG. 4 wherein antenna 71 receives a signal from transmitter 20 and couples it to RF stage 72 of a receiver. The signal is detected in detector 73 and passed to decoder 74 where, for example, a plurality of filters separate tone codes in the transmitted signal. Decoder 74 has three outputs, coupled one each to AND circuits 75–77. The "high beam" input in FIG. 4 is the signal from sensor 61. Inverter 78 changes the sense of the signal so that when the high beams are on, the output of inverter 78 is low, which disables AND circuits 75–78.

Figure 5:
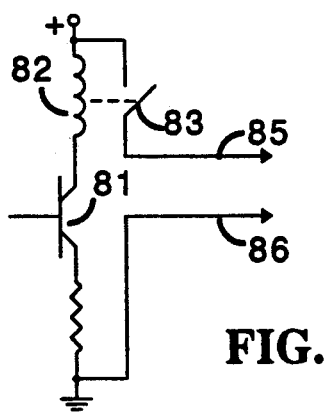
FIG. 5 illustrates a control module/lamp interface.

Pushing one of the buttons on transmitter 20 modulates the transmitted signal with a particular tone. That tone is detected and a switching signal is provided on one of the outputs of decoder 74 corresponding to the selected auxiliary lighting system. The outputs of AND circuits 75–77 are obviously not applied directly to the lamps, suitable driver circuits are employed, such as illustrated in FIG. 5.

Transistor 81 is a power transistor having its base coupled to the output of one of AND gates 75–77. The load for transistor 81 comprises solenoid 82 which controls switch 83. Switch 83 is connected to the supply side of module 30, i.e. to the positive terminal of battery 16, and to wire 85 which is connected to one side of an auxiliary lamp. The other side of the auxiliary lamp is connected to ground by way of wire 86.

When the output of the AND circuit is high, transistor 81 conducts, thereby closing switch 83 and supplying power to the auxiliary lamp.

Installation of the system by the owner of the vehicle is greatly simplified since the owner does not have to locate and drill holes in the firewall or the instrument panel. Plugs 51–53 and 62 are pre-formed with suitable wires which are easily attached to the appropriate leads of the auxiliary lamps. Assembly of the system is self-evident from the coding of the buttons and plugs. Maintenance is facilitated by the recessed sockets resisting the entry of dirt or water and the operation of the system is readily monitored by the highly visible fuses.

There is thus provided by the present invention a means for remotely controlling auxiliary lighting which can be relocated within the cab or cabin of the vehicle and which eliminates the need for passing control wiring through the firewall of the vehicle. The control system of the present invention is capable of automatically controlling auxiliary lighting in conformity with the vehicle manufacturer's recommendations and local traffic laws. Finally, the auxiliary lighting system of the present invention is easily installed by the owner of the vehicle.

It is therefore apparent to those of skill in the art that various modifications can be made within the scope of the present invention. For example, while described in conjunction with auxiliary lighting systems, the control system of the present invention can be used by vehicle manufacturers for controlling original equipment lighting. While four wires are preferred for connection to the auxiliary lamps, two wires (left and right supply only) could be used, relying on conduction through the body or frame of the vehicle for the return.

What is claimed is:

1. In a lighting control system for a motor vehicle having a battery and driving lights, the improvement comprising:
    transmitter means, located in a cabin of said vehicle, for producing a low power radio frequency;
    a lamp mounted on an exterior of said vehicle;
    a control module, including receiving means, for mounting outside the cabin of the vehicle remote from said lamp, said receiving means responsive to said radio frequency signal for connecting said battery to said lamp and thereby energizing said lamp;
    wiring means for interconnecting said lamp and said control module;
    said lamp being controlled from within the cabin of said vehicle by operation of said transmitter means without a direct electrical connection between said transmitter means and said control module; and
    sensing means responsive to an illumination condition of said driving lights to inhibit energization of said lamp.

2. The lighting control system as set forth in claim 1 wherein said control module is mounted within an engine compartment of said vehicle.

3. The lighting control system as set forth in claim 1 wherein said system includes a plurality of lamps, said transmitter produces a tone encoded signal, and in which said control module comprises:
    decoding means, coupled to said receiving means, for detecting the presence of a predetermined code; and
    logic means for selectively operating one or more of said lamps in accordance with said predetermined code.

4. The lighting control system as set forth in claim 1 wherein said control module includes recessed sockets and said wiring means comprises plugs for fitting into said sockets.

5. The lighting control system as set forth in claim 4 wherein said plugs and sockets are shaped to prevent rotation thereof when engaged.

6. The lighting control system as set forth in claim 1 wherein said transmitter produces an encoded signal and said control means includes
    a plurality of switch means and
    decoding means connected to said plurality of switch means for selectively controlling more than one lamp.

* * * * *